(12) United States Patent
Kaup et al.

(10) Patent No.: US 12,476,276 B2
(45) Date of Patent: Nov. 18, 2025

(54) LITHIUM-ION CONDUCTING HALOBORO-OXYSULFIDES

(71) Applicants: BASF SE, Ludwigshafen am Rhein (DE); University of Waterloo, Waterloo (CA)

(72) Inventors: Kavish Kaup, Waterloo (CA); Linda Nazar, Waterloo (CA); Joem Kulisch, Ludwigshafen am Rhein (DE); Xiaohan Wu, Ludwigshafen am Rhein (DE)

(73) Assignees: BASF SE, Ludwigshafen am Rhein (DE); UNIVERSITY OF WATERLOO, Waterloo (CA)

( * ) Notice: Subject to any disclaimer, the term of this patent is extended or adjusted under 35 U.S.C. 154(b) by 670 days.

(21) Appl. No.: 17/620,229

(22) PCT Filed: Jun. 16, 2020

(86) PCT No.: PCT/EP2020/066610
§ 371 (c)(1),
(2) Date: Dec. 17, 2021

(87) PCT Pub. No.: WO2020/254314
PCT Pub. Date: Dec. 24, 2020

(65) Prior Publication Data
US 2022/0246982 A1    Aug. 4, 2022

(30) Foreign Application Priority Data
Jun. 17, 2019 (EP) .................................. 19180687

(51) Int. Cl.
*H01M 10/0562* (2010.01)
*C03C 3/064* (2006.01)
(Continued)

(52) U.S. Cl.
CPC ......... *H01M 10/0562* (2013.01); *C03C 3/064* (2013.01); *C03C 3/11* (2013.01); *C03C 4/14* (2013.01); *H01M 2300/008* (2013.01)

(58) Field of Classification Search
CPC ........ H01M 10/0562; H01M 2300/008; C03C 3/064
(Continued)

(56) References Cited

U.S. PATENT DOCUMENTS

2014/0329118 A1* 11/2014 Nagase ................. H01M 4/131
429/66
2015/0236320 A1    8/2015 Laramie et al.
(Continued)

FOREIGN PATENT DOCUMENTS

| JP | 201493260 A | 5/2014 |
|---|---|---|
| WO | 2018054709 A1 | 3/2018 |
| WO | 2019107879 A1 | 6/2019 |

OTHER PUBLICATIONS

Z. Liu, et al. "Anomalous High Ionic Conductivity of Nanoporous β-Li3PS4", Journal of the American Chemical Society 2013, 135, 4 pages.
(Continued)

*Primary Examiner* — Nicholas A Smith
*Assistant Examiner* — Kevin Nguyen
(74) *Attorney, Agent, or Firm* — Armstrong Teasdale LLP

(57) ABSTRACT

Described are a solid material which has ionic conductivity for lithium ions, a process for preparing the solid material, a use of the solid material as a solid electrolyte for an electrochemical cell, a solid structure selected from the group consisting of a cathode, an anode and a separator for an electrochemical cell, and an electrochemical cell including the solid structure.

15 Claims, 6 Drawing Sheets

Figure 1:
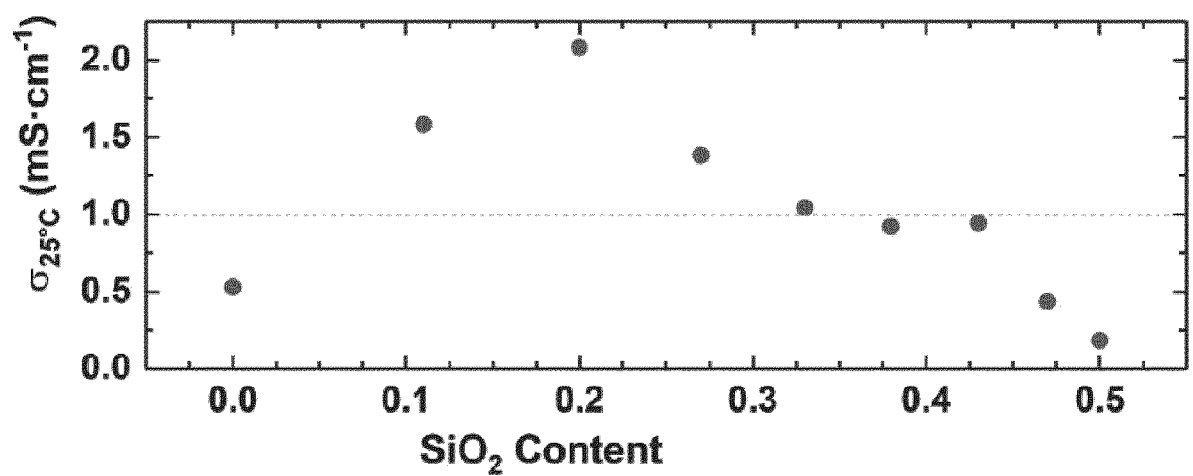

(51) Int. Cl.
*C03C 3/11* (2006.01)
*C03C 4/14* (2006.01)
(58) Field of Classification Search
USPC .................................................. 429/323
See application file for complete search history.

(56) References Cited

U.S. PATENT DOCUMENTS

| | | | |
|---|---|---|---|
| 2016/0156065 A1* | 6/2016 | Visco | C03C 4/18 65/106 |
| 2019/0148768 A1 | 5/2019 | Visco et al. | |
| 2023/0335789 A1 | 10/2023 | Visco et al. | |

OTHER PUBLICATIONS

K. N. Wood, et al. "Operando X-ray photoelectron spectroscopy of solid electrolyte interphase formaton and evolution in Li2S—P2S5 solid-state electrolytes," Nature Communications, 2018, 9, 2490, 10 pages.
S. Wenzel, et al. "Interphase formation and degradation of charge transfer kinetics between a lithium metal anode and highly crystalline Li7P3S11 solid electrolyte", Solid State Ionics 2016, 286, pp. 24-33.
S. Wenzel, et al. "Direct Observation of the Interfacial Instability of the Fast Ionic Conductor Li10Gep2S12 at the Lithuim Metal Anode", Chemistry of Materials, 2016, 28, 2400, 8 pages.
S. Wenzel, et al. Interphase formation on lithium solid electrolytes— An in situ approach to study interfacial reactions by photoelectron spectroscopy, Solid State Ionics 2015, 278, pp. 98-105.
W. D. Richards, et al. "Interface Stability in Solid-State Batteries" Chemistry of Materials 2015, 28, 8 pages.
R. Koerver, et al. "Redox-active cathode interphases in solid-state batteries," Journal of Materials Chem. A 2017, 5, 22750, 11 pages.
Changming et al. "Oxysulphide glasses-a new kind of lithium ion conductors", Solid State Ionics, North Holland Pub. Company, Amsterdamn, vol. 48, No. 3-4, Nov. 1991, pp. 289-293.
International Search Report for PCT/EP2020/066610 mailed Aug. 17, 2020, 2 pages.

\* cited by examiner

LITHIUM-ION CONDUCTING HALOBORO-OXYSULFIDES

CROSS-REFERENCE TO RELATED APPLICATION(S)

The present application is a national phase of International Application No. PCT/EP2020/066610, filed on Jun. 16, 2020, which claims the benefit of European Patent Application Ser. No. 19/180,687.6, filed on Jun. 17, 2019. The contents of these applications are hereby incorporated by reference in their entirety.

FIELD OF THE INVENTION

Described are a solid material which has ionic conductivity for lithium ions, a process for preparing said solid material, a use of said solid material as a solid electrolyte for an electrochemical cell, a solid structure selected from the group consisting of a cathode, an anode and a separator for an electrochemical cell, and an electrochemical cell comprising such solid structure.

BACKGROUND OF THE INVENTION

Due to the wide-spread use of all solid state lithium batteries, there is an increasing demand for solid state electrolytes having a high conductivity for lithium ions. An important class of such solid electrolytes are sulfidic and oxidic glassy materials. In glassy solid electrolyte materials, the absence of crystalline pathways leads to isotropic conduction substantially without any grain boundary resistance. The absence of grain boundaries in glassy electrolyte materials may also prevent dendrite formation because amorphous electrolyte materials may be obtained as dense, defect free films by a melt-quench approach. Typically, these materials contain $Li_2S$ in addition to a glass former such as $B_2S_3$. Lithium halide salts (e.g. LiX wherein X=Cl, Br, I) or lithium ortho-oxosalts (e.g. $Li_4SiO_4$, $Li_3PO_4$) are added to increase the lithium ion concentration and the ionic conductivities of the glass.

Each of oxides and sulfides exhibits certain desirable properties for solid electrolytes, but also certain disadvantages. Oxides typically provide a more stable structural framework leading to better chemical and electrochemical stability, while sulfides usually have higher ionic conductivity coupled with easy processability. However, sulfide-based solid electrolytes typically suffer from poor air stability and are susceptible to decomposition due to their moisture sensitivity. Many sulfides rapidly react with moisture from the air to decompose and release $H_2S$ gas. Thus, there is a need for electrolytes which combine the advantages of oxides and sulfides, but eliminate the disadvantages.

SUMMARY OF THE INVENTION

It is an objective of the present disclosure to provide a solid material which may be used as a solid electrolyte for an electrochemical cell. In addition, there is provided a process for preparing said solid material, a use of said solid material as a solid electrolyte for an electrochemical cell, a solid structure selected from the group consisting of a cathode, an anode and a separator for an electrochemical cell, and an electrochemical cell comprising such solid structure, wherein said solid structure comprises said solid material.

DETAILED DESCRIPTION OF THE INVENTION

According to a first aspect, there is provided a solid material having a composition according to general formula (I)

$$Li_{2x+z}B_{2y}M_aO_{b\cdot a}S_{x+3y}X_z \quad (I)$$

wherein
M is one or more selected from the group consisting of P, Si, Ge, As and Sb
X is one or more selected from the group consisting of halides and pseudohalides
x is in the range of from 0.1 to 0.7
y is in the range of from 0.05 to 0.5
z is in the range of from 0.01 to 0.5
a is in the range of from 0.01 to 0.5, preferably a is in the range of from 0.05 to 0.48
b is in the range of from 1.9 to 2.6, preferably b is in the range of from 2 to 2.5
$0.995 \leq x+y+z+a \leq 1.005$, preferably $x+y+z+a=1$.

Surprisingly it has been found that solid materials as defined above exhibit favorable lithium ion conductivity as well as electrochemical stability in direct contact with lithium metal and chemical stability against air and moisture.

The composition according to general formula (I) may be considered as an oxysulfide, more specifically as an haloboro-oxysulfide.

A solid material as defined above, i.e. a solid material having a composition according to general formula (I), may be glassy.

Without wishing to be bound by theory it is assumed that the phase diagram of the system $Li_2S$—$B_2S_3$—$MO_b$—$LiX$ (wherein M, b and X are as defined above) exhibits at least one glass-forming domain, and a composition according to general formula (I) apparently is within such domain.

As used herein, the term "pseudohalides" denotes monovalent anions, which resemble halide anions with regard to their chemistry, and therefore can replace halide anions in a chemical compound without substantially changing the properties of such compound. The term "pseudohalide ion" is known in the art, cf. the IUPAC Goldbook. Examples of pseudohalide anions are $N_3^-$, $SCN^-$, $CN^-$, $OCN^-$, $BF_4^-$ and $BH_4^-$. In case the pseudohalide contains elements from the group consisting of B, S and O, such content of B, S and O is not considered in the above-defined parameters x, y, a and b of general formula (I). In contrast, the total amount of halides and pseudohalides is indicated by the parameter "z" of general formula (I). In pseudohalide-containing compositions of general formula (I) the pseudohalide is preferably selected from the group consisting of $SCN^-$, $BF_4^-$ and $BH_4^-$.

The solid material having a composition according to general formula (I) may be considered as a combination of (1) $Li_2S$, (2) $B_2S_3$, (3) one or more oxides of M, and (4) one or more compounds LiX. Without wishing to be bound by theory, it is presently assumed that in the solid material having a composition according to general formula (I) the oxide (3) (wherein M is as defined above) may act as secondary glass network former beside the primary glass network former $B_2S_3$ (2) while $Li_2S$ (1) acts a s a glass network modifier and LiX (4) provides further lithium ions. Moreover, the incorporation of the secondary glass network former restructures the thioborate network (network formed by the primary glass network former $B_2S_3$) to enable dissolution of a larger amount of LiX within the glass matrix, which increases both concentration and mobility of Li ions.

A solid material according to the above-defined first aspect, i.e. a solid material having a composition according to general formula (I), may be amorphous. A material is referred to as amorphous when it lacks the long range order that is characteristic of a crystal, as indicated by the absence of clearly defined reflections in its X-ray diffraction pattern. In this context, a reflection is considered as clearly defined if its intensity is more than 10% above the background.

A solid material according to the above-defined first aspect may be accompanied by secondary phases and/or impurity phases having a composition not according to general formula (I) as defined above. In such case, the volume fraction having a composition according to general formula (I) may be 50% or more, sometimes 80% or more, preferably 90% or more, most preferably 95% or more, based on the total volume of the solid material according to the above-defined first aspect and all secondary phases and impurity phases.

The secondary phases resp. impurity phases can be crystalline or amorphous. Typically, if the solid material having a composition according to general formula (I) as defined above is accompanied by secondary phases resp. impurity phases, at least one of said secondary phases resp. impurity phases is a crystalline phase. If crystalline secondary phases resp. impurity phases are present, the volume fraction of crystalline phases may be 20% or less, sometimes 10% or less, or 5% or less, or 1% or less, based on the total volume of the solid material having a composition according to general formula (I) and all secondary phases and impurity phases. Typically, the solid material having a composition according to general formula (I) is the only amorphous phase. When there is a secondary phase resp. impurity phase present that is crystalline (for example, LiI), the volume fraction of the solid material having a composition according to general formula (I) may be determined by standard addition of a known crystalline material.

If present, the secondary phases and impurity phases mainly consist of the precursors used for preparing the solid material ((1) $Li_2S$, (2) $B_2S_3$ or both of B and S, (3) one or more oxides of M wherein M is as defined above, (4) on or more compounds LiX wherein X is as defined above) resp. intermediates formed from said precursors (e.g. $B_2S_3$ in case B and S are provided in elementary form as precursor (2)), and in some cases impurity phases which may origin from impurities of the precursors. For details of preparing a solid material of the above-defined first aspect, see the information provided below in the context of the second aspect of this disclosure.

In certain solid materials according to the above-defined first aspect M is selected from the group consisting of Si, P and Sb.

In certain solid materials according to the above-defined first aspect X is selected from the group consisting of Cl, Br and I.

In specific solid materials according to the above-defined first aspect M is selected from the group consisting of Si, P and Sb, and X is selected from the group consisting of Cl, Br and I. Said specific solid materials consist of Li, B, M (wherein M is selected from the group consisting of Si, P and Sb), O, S and X (wherein X is selected from the group consisting of Cl, Br and I) in a molar ratio according to general formula (I).

In particularly specific solid materials according to the above-defined first aspect M is Si and X is selected from the group consisting of Cl, Br and I. Said specific solid materials consist of Li, B, Si, O, S and X (wherein X is selected from the group consisting of Cl, Br and I) in a molar ratio according to general formula (I).

A solid material according to the above-defined first aspect may have an ionic conductivity of 0.1 mS/cm or more, preferably 1 mS/cm or more at 25° C. The ionic conductivity is determined in the usual manner known in the field of battery materials development by means of electrochemical impedance spectroscopy (for details see examples section below).

At the same time, a solid material according to the above-defined first aspect exhibits an almost negligible electronic conductivity. More specifically the electronic conductivity may be at least 3 orders of magnitude lower than the ionic conductivity, preferably at least 5 orders of magnitude lower than the ionic conductivity. In certain cases, a solid material according to the above-defined first aspect exhibits an electronic conductivity of $10^{-9}$ S/cm or less. The electronic conductivity is determined in the usual manner known in the field of battery materials development by means of direct-current (DC) polarization measurements at different voltages (for details see examples section below).

It was observed that with regard to the lithium ion conductivity it is favourable that the parameter "a" of general formula (I) which defines the content of the oxide of the metal M (wherein M is as defined above) is in the range of from 0.1 to 0.45, preferably of from 0.2 to 0.3.

It was observed that with regard to the lithium ion conductivity it is favourable that the parameter "z" of general formula (I) which defines the content of LiX (wherein X is as defined above) is in the range of from 0.26 to 0.41, preferably of from 0.33 to 0.4.

Preferably, the parameter "a" of general formula (I) which defines the content of the oxide of the metal M is in the range of from 0.1 to 0.45, preferably of from 0.2 to 0.3, and the parameter "z" of general formula (I) which defines the content of LiX is in the range of from 0.26 to 0.41, preferably of from 0.33 to 0.4.

A solid material according to the above-defined first aspect may be in the form of a monolithic glass, e.g. a melt-cast monolithic glass.

A solid material according to the above-defined first aspect may be in the form of a sheet. Preferably said sheet is a thin sheet, e.g. a sheet having a thickness in the range of from 0.1 µm to 10 mm, e.g. 10 µm to 10 mm. Preferably, said sheet is free-standing.

In a specific group of solid materials according to the above-defined first aspect M is Si and X is I. Thus, a solid material of the above-defined specific group has a composition according to general formula (Ia)

$$Li_{2x+z}B_{2y}Si_aO_{b+a}S_{x+3y}I_z \qquad (Ia)$$

wherein x is in the range of from 0.1 to 0.3 y is in the range of from 0.1 to 0.25 z is in the range of from 0.2 to 0.48, preferably z is in the range of from 0.26 to 0.41 a is in the range of from 0.08 to 0.5, preferably a is in the range of from 0.1 to 0.45 b is in the range of from 1.95 to 2.05, preferably b is 2

$0.995 \leq x+y+z+a \leq 1.005$, preferably $x+y+z+a=1$.

Surprisingly it has been found that solid materials of the above-defined specific group exhibit favorable lithium ion conductivity as well as electrochemical stability in direct contact with lithium metal and chemical stability against air and moisture.

The composition according to general formula (Ia) may be considered as a lithium iodothioborosilicate.

A solid material of the above-defined specific group, i.e. a solid material having a composition according to general formula (Ia), may be glassy.

Without wishing to be bound by theory it is assumed that the phase diagram of the quaternary system $Li_2S$—$B_2S_3$—$SiO_2$—LiI exhibits at least one glass-forming domain, and a composition according to general formula (Ia) apparently is within such domain.

The solid material having a composition according to general formula (Ia) may be considered as combination of (1) $Li_2S$, (2) $B_2S_3$, (3) oxide of Si, and (4) LiI. Without wishing to be bound by theory, it is presently assumed that in the solid material having a composition according to general formula (Ia) the oxide (3) of Si (typically $SiO_2$) may act as secondary glass network former beside the primary glass network former $B_2S_3$ (2) while $Li_2S$ (1) acts as a glass network modifier and LiI (4) provides further lithium ions. Moreover, the incorporation of the secondary glass network former $SiO_2$ restructures the thioborate network (network formed by the primary glass network former $B_2S_3$) to enable dissolution of a larger amount of LiI within the glass matrix, which increases both concentration and mobility of Li ions. Surprisingly, even the addition of a small amount of $SiO_2$ enables dissolution of a significant amount of LiI within the glass matrix. Accordingly, $SiO_2$ has a strong glass-forming ability, and is therefore a favorable secondary glass network former.

A solid material of the above-defined specific group, i.e. a solid material having a composition according to general formula (Ia), may be amorphous. A material is referred to as amorphous when it lacks the long range order that is characteristic of a crystal, as indicated by the absence of clearly defined reflections in its X-ray diffraction pattern. In this context, a reflection is considered as clearly defined if its intensity is more than 10% above the background.

A solid material of the above-defined specific group may be accompanied by secondary phases and/or impurity phases having a composition not according to general formula (Ia) as defined above. In such case, the volume fraction having a composition according to general formula (Ia) may be 50% or more, sometimes 80% or more, preferably 90% or more, most preferably 95% or more, based on the total volume of the solid material of the above-defined specific group and all secondary phases and impurity phases.

The secondary phases can be crystalline or amorphous. Typically, if the solid material having a composition according to general formula (Ia) as defined above is accompanied by secondary phases resp. impurity phases, at least one of said secondary phases resp. impurity phases is a crystalline phase. If crystalline secondary phases resp. impurity phases are present, the volume fraction of crystalline phases may be 20% or less, sometimes 10% or less, preferably 5% or less, most preferably 1% or less, based on the total volume of the solid material having a composition according to general formula (Ia) and all secondary phases and impurity phases. Typically, the solid material having a composition according to general formula (I) is the only amorphous phase. When there is a secondary phase resp. impurity phase present that is crystalline (for example, LiI), the volume fraction of the solid material having a composition according to general formula (Ia) may be determined by standard addition of a known crystalline material.

If present, the secondary phases and impurity phases mainly consist of the precursors used for preparing the solid material ($Li_2S$, S, B, $SiO_2$, LiI) resp. intermediates formed from said precursors (e.g. $B_2S_3$), and in some cases impurity phases which may origin from impurities of the precursors. For details of preparing a solid material of the above-defined specific group, see the information provided below in the context of the second aspect of this disclosure.

A solid material of the above-defined specific group may have an ionic conductivity of 0.1 mS/cm or more, preferably 1 mS/cm or more at 25° C. The ionic conductivity is determined in the usual manner known in the field of battery materials development by means of electrochemical impedance spectroscopy (for details see examples section below).

At the same time, a solid material of the above-defined specific group exhibits an almost negligible electronic conductivity. More specifically the electronic conductivity may be at least 3 orders of magnitude lower than the ionic conductivity, preferably at least 5 orders of magnitude lower than the ionic conductivity. In certain cases, a solid material of the above-defined specific group exhibits an electronic conductivity of $10^{-9}$ S/cm or less. The electronic conductivity is determined in the usual manner known in the field of battery materials development by means of direct-current (DC) polarization measurements at different voltages (for details see examples section below).

It was observed that with regard to the lithium ion conductivity it is favourable that the parameter "a" of general formula (Ia) which defines the content of silicon oxide (typically $SiO_2$) is in the range of from 0.1 to 0.45, preferably of from 0.2 to 0.3.

It was observed that with regard to the lithium ion conductivity it is favourable that the parameter "z" of general formula (Ia) which defines the content of LiI is in the range of from 0.26 to 0.41, preferably of from 0.33 to 0.4.

Preferably, the parameter "a" of general formula (Ia) which defines the content of silicon oxide (typically $SiO_2$) is in the range of from 0.1 to 0.45, preferably of from 0.2 to 0.3, and the parameter "z" of general formula (Ia) which defines the content of LiI is in the range of from 0.26 to 0.41, preferably of from 0.33 to 0.4.

A solid material of the above-defined specific group may be in the form of a monolithic glass, e.g. a melt-cast monolithic glass.

A solid material of the above-defined specific group may be in the form of a sheet. Preferably said sheet is a thin sheet, e.g. a sheet having a thickness in the range of from 0.1 μm to 10 mm, e.g. 10 μm to 10 mm. Preferably, said sheet is free-standing.

Preferred solid materials according to the first aspect as defined above are those having one or more of the specific features disclosed above.

According to a second aspect, there is provided a process for obtaining a solid material according to the above-defined first aspect. Said process comprises the following process steps:
  a) providing the precursors
    (1) $Li_2S$
    (2) $B_2S_3$ or both of boron and sulfur
    (3) one or more oxides of elements M selected from the group consisting of P, Si, Ge, As and Sb
    (4) one or more compounds LiX wherein X is selected from the group consisting of halides and pseudohalides
  b) preparing a mixture comprising the precursors provided in step a), wherein in said mixture the molar ratio of the elements Li, S, B, M, O and X matches general formula (I)
  c) heat-treating the mixture prepared in process step b) to obtain a melt d) quenching the melt obtained in step c) so that a solid material having a composition according to general formula (I) is obtained.

The process according to the above-defined second aspect is referred to as "melt-quenching". Such process is cost-effective and easily scalable. It allows obtaining the solid material in the form of a vitreous sheet, especially of a thin sheet, e.g. a sheet having a thickness in the range of from 0.1 µm to 10 mm, e.g. 10 µm to 10 mm. Preferably, said sheet is free-standing.

In step a) of the process according to the above-defined second aspect, precursors for the mixture to be prepared in step b) are provided. Said precursors are
(1) $Li_2S$
(2) $B_2S_3$ or both of B and S, i.e. either the compound $B_2S_3$, or B and S each in elementary form
(3) one or more oxides of elements M selected from the group consisting of P, Si, Ge, As and Sb
(4) one or more compounds LiX wherein X is selected from the group consisting of halides and pseudohalides.

In certain processes according to the above-defined second aspect the one or more oxides (3) are selected from the group consisting of oxides of Si, P and Sb.

In certain processes according to the above-defined second aspect the one or more compounds LiX (4) are selected from LiCl, LiBr and LiI.

In specific processes according to the above-defined second aspect the one or more oxides (3) are selected from the group consisting of oxides of Si, P and Sb; and the one or more compounds LiX are selected from LiCl, LiBr and LiI.

In a particularly specific process according to the above-defined second aspect the oxide is $SiO_2$ and the one or more compounds LiX are selected from LiCl, LiBr and LiI. In said particularly specific process the precursors provided in step a) may be (1) $Li_2S$, (2) S and B each in elementary form, (3) $SiO_2$ and (4) one or more of LiCl, LiBr and LiI.

In step b) of the process according to the above-defined second aspect, a mixture comprising the precursors (1) through (4) provided in step a) as defined above is prepared. In said mixture prepared in step b), the molar ratio of the elements Li, S, B, M (wherein M is as defined above), O and X (wherein X is as defined above) matches general formula (I).

In specific cases, said mixture prepared in step b) consists of the precursors (1) through (4) provided in step a).

In step b) mixing may be performed by means of mechanical milling e.g. by means of ball milling.

It is useful that in step b) any handling is performed under a protective gas atmosphere.

In step b) the mixture comprising the precursors may be formed into pellets, which are heat-treated in step c).

In step c) of the process according to the above-defined second aspect, the mixture prepared in process step b) is heat-treated to obtain a melt, typically a vitreous melt. Accordingly, step c) involves heat treating at a temperature above the melting temperature of the mixture prepared in step b).

Heat-treating may be performed in a closed vessel. The closed vessel may be a sealed quartz tube or any other type of container which is capable of withstanding the temperature of the thermal treatment and is not subject to reaction with the constituents of the glass, such as a glassy carbon crucible or a tantalum crucible.

Preferably, step c) comprises
a first stage of heat-treating at a temperature in the range of from 400° C. to 650° C. for a duration of 1 to 13 hours, preferably 5 to 13 hours,
and
a second stage of heat treating at a temperature in the range of from 700° C. to 1000° C., preferably in the range of from 700° C. to 900° C. for a duration of from 1 to 40 hours, preferably of from 20 to 30 hours.

In step d) of the process according to the above-defined second aspect, the melt obtained in step c) is quenched so that a solid material having a composition according to general formula (I) is obtained.

Quenching may be performed by contacting the melt obtained in step c) with water, with ice, with a sub-cooled gas (e.g. liquid nitrogen or liquid argon), with a metal plate or with a chemically inert mold (e.g. a mold made of a corrosion-resistant material, preferably a mold made of a metal) so that fast cooling is achieved.

Upon quenching the melt obtained in step c) may be formed into a monolithic glass, e.g. a melt-cast monolithic glass.

Upon quenching the melt obtained in step c) may be formed into a glass sheet. The glass sheet can be obtained in the form of a continuous sheet, which is then cut to the desired size.

A specific process according to the above-defined second aspect is suitable for preparing a solid material of the above-defined specific group of solid materials according to the above-defined first aspect.

In step a) of said specific process according to the above-defined second aspect, which is suitable for preparing a solid material of the above-defined specific group of solid materials according to the above-defined first aspect, the precursors provided in step a) are
(1) $Li_2S$
(2) boron and sulfur, both in elemental form, or $B_2S_3$
(3) $SiO_2$
(4) LiI.

In step b) of said specific process according to the above-defined second aspect, which is suitable for preparing a solid material of the above-defined specific group of solid materials according to the above-defined first aspect, a mixture comprising the precursors (1) through (4) provided in step a) as defined above is prepared. In said mixture prepared in step b), the molar ratio of the elements Li, S, B, Si, O and I matches general formula (Ia).

In specific cases, said mixture prepared in step b) consists of the precursors (1) through (4) provided in step a) as defined above.

In step b) mixing may be performed by means of mechanical milling e.g. by means of ball milling.

It is useful that in step b) any handling is performed under a protective gas atmosphere.

In step b) the mixture comprising the precursors may be formed into pellets, which are heat-treated in step c).

In step c) of said specific process according to the above-defined second aspect, the mixture prepared in process step b) is heat-treated to obtain a melt, typically a vitreous melt. For further details of step c), reference is made to the disclosure provided above.

In step d) of said specific process according to the above-defined second aspect, the melt obtained in step c) is quenched so that a solid material having a composition according to general formula (Ia) is obtained. For further details of step d), reference is made to the disclosure provided above.

Preferred processes according to the second aspect as defined above are those having one or more of the specific features disclosed above.

A solid material according to above-defined first aspect resp. obtained by the process according to the above-defined second aspect can be used as a solid electrolyte for an electrochemical cell. Herein the solid electrolyte may form a component of a solid structure for an electrochemical cell, wherein said solid structure is selected from the group consisting of cathode, anode and separator. Accordingly, a solid material according to above-defined first aspect resp. obtained by the process according to the above-defined second aspect can be used alone or in combination with additional components for producing a solid structure for an electrochemical cell, such as a cathode, an anode or a separator.

Thus, the present disclosure further provides the use of a solid material according to above-defined first aspect resp. obtained by the process according to the above-defined second aspect as a solid electrolyte for an electrochemical cell. More specifically, the present disclosure further provides the use of a solid material according to above-defined first aspect resp. obtained by the process according to the above-defined second aspect as a component of a solid structure for an electrochemical cell, wherein said solid structure is selected from the group consisting of cathode, anode and separator.

In the context of the present disclosure, the electrode where during discharging a net negative charge occurs is called the anode and the electrode where during discharging a net positive charge occurs is called the cathode. The separator electronically separates a cathode and an anode from each other in an electrochemical cell.

The cathode of an all-solid-state electrochemical cell usually comprises beside an active cathode material as a further component a solid electrolyte. Also the anode of an all-solid-state electrochemical cell usually comprises a solid electrolyte as a further component beside an active anode material.

The form of the solid structure for an electrochemical cell, in particular for an all-solid-state lithium battery, depends in particular on the form of the produced electrochemical cell itself.

The present disclosure further provides a solid structure for an electrochemical cell selected from the group consisting of cathode, anode and separator, wherein the solid structure for an electrochemical cell comprises a solid material according to above-defined first aspect resp. obtained by the process according to the above-defined second aspect.

The present disclosure further provides an electrochemical cell comprising a solid material according to above-defined first aspect resp. obtained by the process according to the above-defined second aspect. In said electrochemical cell, the solid material according to above-defined first aspect resp. obtained by the process according to the above-defined second aspect may form a component of one or more solid structures selected from the group consisting of cathode, anode and separator.

The above-defined electrochemical cell may be a rechargeable electrochemical cell comprising the following constituents α) at least one anode,
β) at least one cathode,
γ) at least one separator, wherein at least one of the three constituents is a solid structure comprising a solid material according to above-defined first aspect resp. obtained by the process according to the above-defined second aspect.

Suitable electrochemically active cathode materials and suitable electrochemically active anode materials are known in the art. In an electrochemical cell as described above the anode α) may comprises graphitic carbon, metallic lithium or a metal alloy comprising lithium as the anode active material.

Electrochemical cells as described above may be alkali metal containing cells, especially lithium-ion containing cells. In lithium-ion containing cells, the charge transport is effected by $Li^+$ ions.

Due to its superior electrochemical stability in direct contact with lithium metal, in certain preferred cases in a solid structure as defined above a solid material according to the above-defined first aspect resp. obtained by the process according to the above-defined second aspect may be in direct contact with an anode comprising lithium metal, so that no protecting layer is needed between them. Thus, in an all solid state battery a solid material according to the above-defined first aspect resp. obtained by the process according to the above-defined second aspect may be applied as a solid electrolyte or as a component of a solid electrolyte in direct contact with an anode comprising lithium metal or with an alloy comprising lithium metal. Due to the superior electrochemical stability of said solid electrolyte in direct contact with lithium metal, such all solid state battery may exhibit favorable cycling stability, Coulombic efficiency and capacity retention over a large number of cycles.

The electrochemical cell may have a disc-like or a prismatic shape. The electrochemical cells can include a housing that can be from steel or aluminum.

A plurality of electrochemical cells as described above may be combined to an all solid-state battery, which has both solid electrodes and solid electrolytes. A further aspect of the present disclosure refers to batteries, more specifically to an alkali metal ion battery, in particular to a lithium ion battery comprising at least one electrochemical cell as described above, for example two or more electrochemical cells as described above. Electrochemical cells as described above can be combined with one another in alkali metal ion batteries, for example in series connection or in parallel connection. Series connection is preferred.

The electrochemical cells resp. batteries described herein can be used for making or operating cars, computers, personal digital assistants, mobile telephones, watches, camcorders, digital cameras, thermometers, calculators, laptop BIOS, communication equipment or remote car locks, and stationary applications such as energy storage devices for power plants. A further aspect of the present invention is a method of making or operating cars, computers, personal digital assistants, mobile telephones, watches, camcorders, digital cameras, thermometers, calculators, laptop BIOS, communication equipment, remote car locks, and stationary applications such as energy storage devices for power plants by employing at least one inventive battery or at least one inventive electrochemical cell.

A further aspect of the present disclosure is the use of the electrochemical cell as described above in motor vehicles, bicycles operated by electric motor, robots, aircraft (for example unmanned aerial vehicles including drones), ships or stationary energy stores.

The present disclosure further provides a device comprising at least one inventive electrochemical cell as described above. Preferred are mobile devices such as are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven tackers.

The invention is illustrated further by the following examples which are not limiting.

EXAMPLES

1. Preparation of Materials

Step a)

The following precursors were provided.
(1) $Li_2S$ (Sigma Aldrich, 99.98%)
(2) boron (Sigma Aldrich 99%) and sulfur, both in elemental form
(3) $SiO_2$
(4) LiI.

Step b)

Mixtures of the precursors provided in step a) were prepared by grounding the precursors together in such amounts that in the obtained mixture the molar ratio of the elements Li, S, B, M, O and X matches general formula (I).

For comparison, mixtures were prepared without adding $SiO_2$.

Each mixture was pelletized.

All handling of powders was carried out in an argon-filled glove box.

Step c)

For heat treating each pelletized mixture obtained in step b) was placed in a glassy carbon crucible which was placed in a quartz tube. Each quartz tube was sealed under vacuum and placed vertically in a furnace. The tubes were heated up to 500° C. and held for 12 hours, then at 800° C. for 20 hours.

Step d)

After heat treating was completed the obtained melts were quenched in ice water.

The obtained materials were in powder form. For details of the composition of the obtained materials, see the table below.

2. Ionic Conductivity and Electronic Conductivity

The bulk resistance of samples of the obtained solid materials was determined by electrochemical impedance spectroscopy with an amplitude of 100 mV in the frequency range 10 MHz to 100 mHz using a Bio-logic MTZ-35 impedance analyzer. The measurements were carried out in the temperature range of from 25° C. to 80° C. The samples were obtained by pelletizing the powder material in a 10 mm diameter custom-made Swagelok cell. For recording the impedance spectra, a sample was sandwiched between two indium foils in order to obtain good contact at variable temperatures. Lithium ion conductivity was calculated from the bulk resistance of the sample.

The lithium ion conductivity measured at 25° C. of all samples is given in tables 1 and 2 below:

TABLE 1

| Composition | $SiO_2$ content a | I content z | Ionic Conductivity (mS/cm) with standard deviation of 5 measurements per sample |
|---|---|---|---|
| $LiB_{0.5}SI_{0.5}$ | 0 | 0.5 | 0.64 ± 0.03 |
| $Li_{0.91}B_{0.46}Si_{0.09}O_{0.18}S_{0.91}I_{0.46}$ | 0.09 | 0.46 | 0.55 ± 0.01 |
| $Li_{0.83}B_{0.42}Si_{0.17}O_{0.34}S_{0.83}I_{0.42}$ | 0.17 | 0.42 | 0.43 ± 0.01 |

TABLE 1-continued

| Composition | $SiO_2$ content a | I content z | Ionic Conductivity (mS/cm) with standard deviation of 5 measurements per sample |
|---|---|---|---|
| $Li_{0.81}B_{0.4}Si_{0.2}O_{0.4}S_{0.8}I_{0.4}$ | 0.2 | 0.4 | 1.96 ± 0.04 |
| $Li_{0.77}B_{0.39}Si_{0.23}O_{0.46}S_{0.77}I_{0.39}$ | 0.23 | 0.39 | 1.59 ± 0.04 |
| $Li_{0.71}B_{0.36}Si_{0.29}O_{0.58}S_{0.71}I_{0.36}$ | 0.29 | 0.36 | 1.60 ± 0.02 |
| $Li_{0.67}B_{0.33}Si_{0.33}O_{0.67}S_{0.67}I_{0.33}$ | 0.33 | 0.33 | 1.07 ± 0.02 |
| $Li_{0.5}B_{0.25}Si_{0.5}OS_{0.5}I_{0.25}$ | 0.5 | 0.25 | 0.093 ± 0.002 |

TABLE 2

| Composition | $SiO_2$ content a | I content z | Ionic Conductivity (mS/cm) with standard deviation of 5 measurements per sample |
|---|---|---|---|
| $Li_{1.06}B_{0.48}S_{1.02}I_{0.46}$ | 0 | 0.46 | 0.525 ± 0.005 |
| $Li_{0.94}B_{0.43}Si_{0.11}O_{0.22}S_{0.91}I_{0.41}$ | 0.11 | 0.41 | 1.58 ± 0.04 |
| $Li_{0.85}B_{0.38}Si_{0.2}O_{0.4}S_{0.82}I_{0.37}$ | 0.2 | 0.37 | 2.08 ± 0.03 |
| $Li_{0.77}B_{0.35}Si_{0.27}O_{0.55}S_{0.74}I_{0.33}$ | 0.27 | 0.33 | 1.38 ± 0.02 |
| $Li_{0.71}B_{0.32}Si_{0.33}O_{0.67}S_{0.68}I_{0.31}$ | 0.33 | 0.31 | 1.04 ± 0.01 |
| $Li_{0.65}B_{0.30}Si_{0.38}O_{0.77}S_{0.63}I_{0.28}$ | 0.38 | 0.28 | 0.916 ± 0.006 |
| $Li_{0.61}B_{0.27}Si_{0.43}O_{0.86}S_{0.58}I_{0.26}$ | 0.43 | 0.26 | 0.941 ± 0.011 |
| $Li_{0.57}B_{0.26}Si_{0.47}O_{0.93}S_{0.54}I_{0.25}$ | 0.47 | 0.25 | 0.434 ± 0.006 |
| $Li_{0.53}B_{0.24}Si_{0.50}OS_{0.51}I_{0.23}$ | 0.5 | 0.23 | 0.183 ± 0.004 |

In tables 1 and 2 "I content" means the content of iodine (I).

The data in the tables and FIG. 1 (plot of ionic conductivity vs the $SiO_2$ content for the materials of table 2) show that the ionic conductivity is significantly influenced by the $SiO_2$ content (parameter "a" of formula (Ia)). Addition of small amounts of $SiO_2$ results in a significant increase of the ionic conductivity. Without wishing to be bound by theory this effect is attributed to improved glass formation due to the presence of the secondary glass network former $SiO_2$, compared to the $SiO_2$-free comparison material $Li_{1.06}B_{0.48}S_{1.02}I_{0.46}$. After passing a maximum and then after a slight decrease remaining on a quite high level, the ionic conductivity finally decreases significantly when the $SiO_2$ content is increased further.

In addition, as can be seen from the tables, increasing the LiX content results in increased ionic conductivity.

The electronic conductivity was determined via DC polarization using a 10 mm diameter custom-made cell, where powder was pressed between two stainless steel pistons. A voltage of 0.125, 0.25, 0.5, and 0.75 V, resp., was applied for 1 hour for each measurement. For $Li_{0.85}B_{0.38}Si_{0.20}O_{0.4}S_{0.82}I_{0.37}$ (the material exhibiting the highest ionic conductivity) an electronic conductivity of $5.93*10^{-9}$ S/cm was determined, which is more than five orders of magnitude lower than the ionic conductivity (2.05 mS/cm, cf. table 2).

3. X-Ray Diffraction

For recording the XRD pattern, a powder sample was placed on a zero background holder and sealed with Kapton film. The diffraction pattern was measured in Bragg-Brentano geometry on a Pan Analytical Empryean X-ray diffractometer using Cu K-alpha radiation, in the range of 5 degrees two-theta to 90 degrees two-theta.

Figure 2:
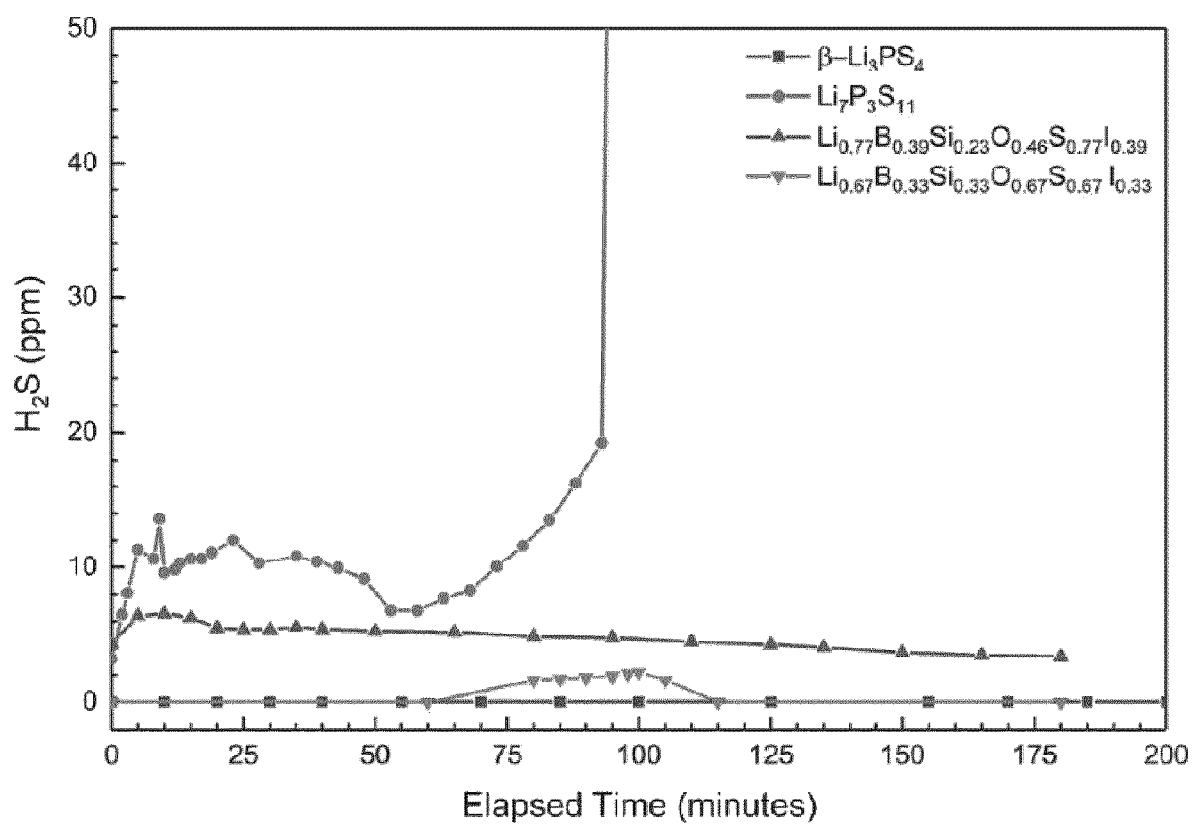

FIG. 2 shows XRD patterns of a set of samples with varying $SiO_2$ content a (for details of the composition, cf. table 2 above).

For this set of samples, the glass forming domain extends from a=0.2 to a=0.43, as evident from the absence of sharp reflexes in the XRD patterns. When the $SiO_2$ content a is outside this range, the material can be regarded as a composite, due to the emergence of reflexes originating from secondary phases resp. impurity phases observed in the XRD patterns.

The decline of the sharp reflexes of LiI secondary phases when the $SiO_2$ content a increases from 0 to 0.2 apparently indicates that the poor glass network forming of the $SiO_2$-free comparison material is significantly improved already by a small amount of $SiO_2$. The better the glass network forming the more LiI is incorporated into the glass network, resulting in vanishing of the reflections of LiI secondary phases (cf. FIG. 2) and in an increase of the ionic conductivity (cf. FIG. 1).

It is assumed that LiI is almost completely dissolved into the glass matrix since the XRD patterns of materials wherein a is in the range of from 0.2 to 0.43 (the glass forming domain) exhibit not reflections or extremely weak reflections only.

At an $SiO_2$ content a of 0.43, reflections of LiI and $SiO_2$ emerge in the XRD pattern which become more pronounced with increasing $SiO_2$ content (cf. FIG. 2). Apparently, LiI and $SiO_2$ start to crystallize out of the glass network. Beyond a=0.43, the samples behave more like nanocomposites, likely containing crystalline $SiO_2$ and LiI nanodomains which disrupt the lithium ion conducting paths and cause a significant drop in conductivity (cf. FIG. 1).

As evident from FIG. 1 samples having a composition falling in the glass forming domain exhibit favorable ionic conductivity, with a maximum of the ionic conductivity at an $SiO_2$ content a=0.23 corresponding to the lower limit of the glass forming domain. The decrease of the lithium ion conductivity with further increase of the $SiO_2$ content within the glass forming domain is probably due to the correlated decrease of the fraction of LiI relative to the gross composition.

While addition of further $SiO_2$ within the glass forming domain is not advantageous in view of the ionic conductivity, it may be advantageous in view of chemical stability (see below).

4. Stability Against Air

Samples were obtained by pressing 100 mg of powder material into 10 mm diameter pellets. For testing the stability against air, the sample was placed in a three-necked round bottom flask. An air pump was run in reverse in order to flow ambient air into the three-neck round bottom flask. The second neck of the flask contained a probe that was directly connected to an $H_2S$ sensor (BW GasAlertMicro 5 Multi-Gas Detector). The probe was placed directly above the sample in order to ensure accurate $H_2S$ monitoring. The third neck was used as an exhaust/outlet port. The air temperature was approximately 23-25° C. with a relative humidity of 40-50%. The $H_2S$ evolution from the samples upon air exposure was monitored for approximately 3 hours.

For comparison, samples of $\beta$-$Li_3PS_4$ (prepared by solution processing, cf. WO 2018/054709 A1), and of $Li_7P_3S_{11}$ and were tested, too.

Figure 3:
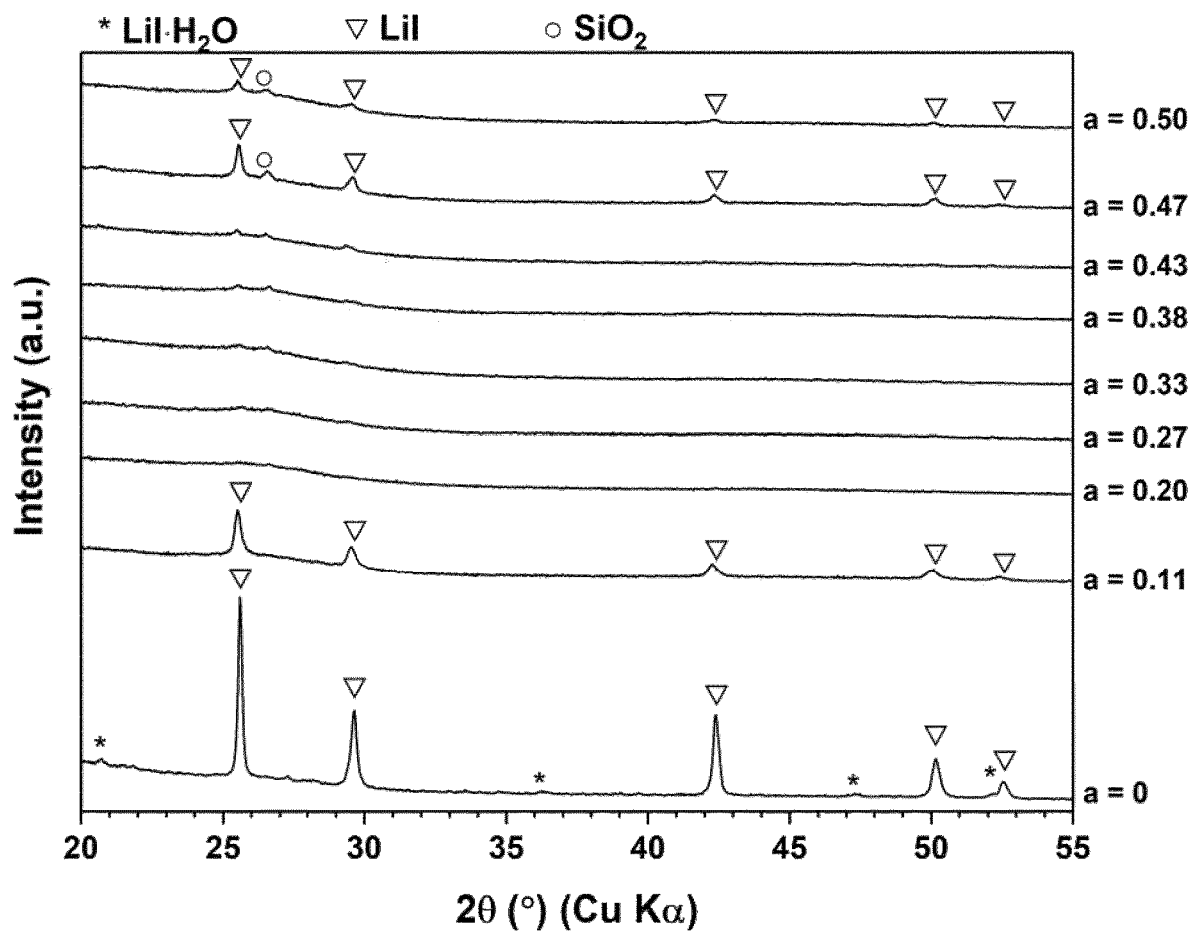

Results of the test are shown in FIG. 3.

As anticipated, $Li_7P_3S_{11}$ exhibited poor stability, showing rapid $H_2S$ evolution at levels greater than 10 ppm in the first 5 minutes. The experiment was curtailed after 100 minutes because the $H_2S$ level reached more than 200 ppm which surpassed the limits of the detector. In contrast, $\beta$-$Li_3PS_4$ exhibited no observable $H_2S$ evolution. This is likely the result of residual solvent in the material due to its low processing temperatures that aids in stabilizing the material under the presence of moisture in the atmosphere.

In contrast, a sample of the composition $Li_{0.77}B_{0.39}Si_{0.23}O_{0.46}S_{0.77}I_{0.5}$ showed 5 ppm $H_2S$ evolution for 3 hours, and a sample of the composition $Li_{0.5}B_{0.25}Si_{0.5}OSI_{0.25}$ showed nearly identical low $H_2S$ evolution like $\beta$-$Li_3PS_4$, except for a transient increase to 2 ppm $H_2S$ noted after 1 hour of air exposure. However, the composition $Li_{0.5}B_{0.25}Si_{0.5}OSI_{0.25}$ exhibits inferior lithium ion conductivity.

Apparently the increase of the number of silicate groups provides an increase in the chemical stability with a tradeoff in the ionic conductivity.

It has to be noted that the experiments conducted here are indicative of somewhat extreme conditions while lithium-ion batteries are typically processed under dry-room conditions with significantly less moisture (<1% relative humidity). Thus, the thioiodoborosilicates studied here appear promising because it may be reasonably expected that they evolve little to no $H_2S$ within the time limits required for battery assembly.

5. Microscopy

Scanning Electron Microscopy images and accompanying Energy Dispersive X-ray Analysis (EDX) of particles of $Li_{0.85}B_{0.38}Si_{0.2}O_{0.4}S_{0.82}I_{0.37}$ (the material exhibiting the highest ionic conductivity) (not shown) as well as scanning transmission electron microscopy (STEM) analysis accompanied by electron energy loss spectra (EELS) (not shown) indicted that the studied materials exhibit a high degree of homogeneity of elemental dispersion on the submicron scale.

6. Thermal Stability

An amount of 5 to 10 mg of solid material was loaded into an aluminum pan and hermetically sealed in an argon filled glovebox with a Tzero sample press. Differential scanning calorimetry (DSC) was conducted using a TA Instruments Q2000 DSC under nitrogen flow. Samples were heated at a rate of 5° C./min from 25° C. to 500° C.

The thermal stability of a glass can be characterized by the softening (glass transition) temperature ($T_g$) and by the stability against crystallization, which is determined by the temperature difference between the temperature of the onset of crystallization ($T_x$) and the glass transition temperature ($T_g$).

The glass transition temperature ($T_g$), the temperature of the onset of crystallization ($T_x$) and the melting temperature $T_l$ of a couple of materials are compiled in table 3. $T_g$ corresponds to the temperature where the highest slope in the drop of the DSC baseline occurs before the exothermic crystallization peak. $T_x$ corresponds to the onset of crystallization from LiI which recrystallizes out of the glass network. Recrystallization of LiI was confirmed by XRD (not shown). $T_l$ does not correspond to the melting of the glass itself but to the melting of LiI which was previously recrystallized from the glass.

It can be seen from table 3 that increase of the $SiO_2$ content from a=0 to a=0.2 results in an increase of $T_g$ and a more significant increase of $T_x$ and $T_l$. Further increase of the $SiO_2$ content to a=0.27 results in a further increase of $T_x$ while $T_g$ and $T_l$ change only slightly. Due to the stronger increase of $T_x$ in contrast to $T_g$, increase of the $SiO_2$ content from a=0 to a=0.27 results in an increase of the thermal stability parameter, $\Delta T_x$ ($T_x$-$T_g$), implying that increase of the $SiO_2$ content results in increased stability of the glass network with respect to recrystallization. Further increase of the $SiO_2$ content to a=0.33 results in some decrease of $T_g$ and $T_x$, while $T_l$ and the thermal stability parameter change only slightly.

TABLE 3

Summary of $T_g$, $T_x$, $T_l$, and calculated thermal stability parameters

| composition | $SiO_2$ content (a) | glass transition temperature $T_g$ (° C.) | onset temperature of crystallization $T_x$ (° C.) | melting temperature $T_l$ (° C.) | thermal stability parameter $\Delta T_x = T_x - T_g$, (° C.) |
|---|---|---|---|---|---|
| $Li_{1.06}B_{0.48}S_{1.02}I_{0.46}$ | 0 | 267 | 272 | 374 | 5 |
| $Li_{0.85}B_{0.38}Si_{0.2}O_{0.4}S_{0.82}I_{0.37}$ | 0.2 | 307 | 330 | 430 | 23 |
| $Li_{0.77}B_{0.35}Si_{0.27}O_{0.55}S_{0.74}I_{0.33}$ | 0.27 | 306 | 341 | 428 | 35 |
| $Li_{0.71}B_{0.32}Si_{0.33}O_{0.67}S_{0.68}I_{0.31}$ | 0.33 | 299 | 335 | 429 | 36 |

7. Electrochemical Studies $Li_{0.85}B_{0.38}Si_{0.2}O_{0.4}S_{0.82}I_{0.37}$ (the material exhibiting the highest ionic conductivity) was subject to electrochemical studies.

Figure 4:
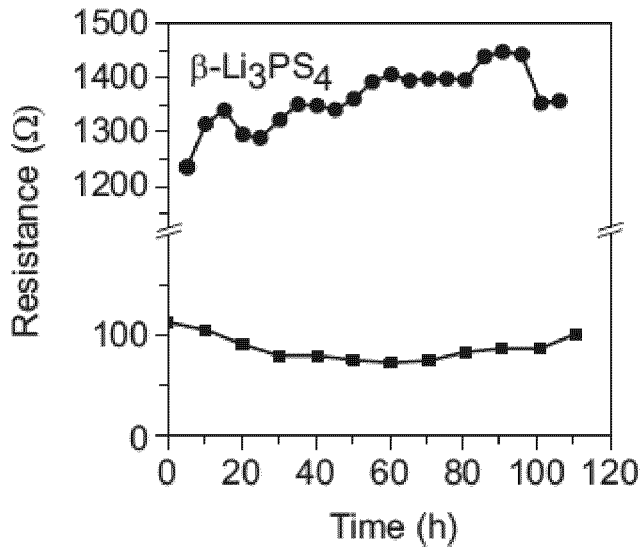

Interfacial reactivity of solid electrolytes in contact with lithium metal was evaluated using a combination of electrochemical impedance spectroscopy (EIS) in conjunction with galvanostatic cycling measurements of symmetric Li|solid electrolyte|Li cells wherein the solid electrolyte is either $Li_{0.85}B_{0.38}Si_{0.2}O_{0.4}S_{0.82}I_{0.37}$ (according to the invention) or $\beta-Li_3PS_4$ (for comparison). The symmetric cells were assembled in a glovebox filled with an argon atmosphere. The solid electrolyte was pressed under a load of 2 tons for 1 min in a 10 mm diameter PEEK cylinder to form a pellet having a thickness of around 0.12 mm. Li metal foil (Sigma Aldrich) was pressed on either side of the pellet in contact with the solid electrolyte. This assembly Li-foil-|solid electrolyte|Li-foil was sandwiched between two stainless steel rods and held under pressure using a custom-made device. The cell was tightened with a torque wrench set at a torque of 4 N·m. Galvanostatic cycling of the cells was performed at room temperature using a Bio-Logic VMP-3. The cell according to the invention was galvanostatically cycled at a current density of 0.1 $mA/cm^2$ to an areal capacity of 0.1 $mAh/cm^2$. The comparison cell was galvanostatically cycled at a current density of 0.1 $mA/cm^2$ to an areal capacity of 0.05 $mAh/cm^2$. Simultaneously the resistance of each cell was measured every 5 cycles using electrochemical impedance spectroscopy at an applied voltage of 100 mV. FIG. 4 shows the development of the cell resistance with increasing cycling time (measured every 5 cycles). The upper graph relates to the comparison cell, and the lower one to the cell according to the invention.

The cell according to the invention exhibits stable cycling (stripping/plating of lithium) for 110 hours with one-tenth the polarization voltage (10 mV) of the comparison cell (100 mV). This difference in large part owes to the significantly higher ionic conductivity of $Li_{0.85}B_{0.38}Si_{0.2}O_{0.4}S_{0.82}I_{0.37}$ compared to $\beta-Li_3PS_4$. The resistance of the comparison cell appears to fluctuate but increases over cycling. The increase of the resistance of the comparison cell is known in the art for $\beta-Li_3PS_4$. see e.g. Z. Liu, W. Fu, E. A. Payzant, X. Yu, Z. Wu, N. J. Dudney, J. Kiggans, K. Hong, A. J. Rondinone, C. Liang, J. Am. Chem. Soc. 2013, 135, 975, and may be attributed to the formation of a passivating interphase composed of $Li_2S$ and $Li_3P$ which is known in the art, see e.g. K. N. Wood, K. X. Steirer, S. E. Hafner, C. Ban, S. Santhanagopalan, S. H. Lee, G. Teeter, Nat. Commun. 2018, 9, 2490. Because of its formation of a passivating interphase, $\beta-Li_3PS_4$ has been widely regarded as one of the most stable solid-electrolytes in contact with Li metal, in comparison to other state of the art solid electrolytes, see e.g. S. Wenzel, D. A. Weber, T. Leichtweiss, M. R. Busche, J. Sann, J. Janek, Solid State Ionics 2016, 286, 24; S. Wenzel, S. Randau, T. Leichtweiß, D. A. Weber, J. Sann, W. G. Zeier, J. Janek, Chem. Mater. 2016, 28, 2400; and S. Wenzel, T. Leichtweiss, D. Krüger, J. Sann, J. Janek, Solid State Ionics 2015, 278, 98. In contrast, the cell according to the invention does not show a significant increase of the resistance over cycling. This effect may be attributed the incorporation of LiI in the solid electrolyte of the cell according to the invention.

Battery cycling tests were carried out with an all solid state cell comprising an anode made of an Li—In alloy, a solid electrolyte layer (separator) made of $Li_{0.85}B_{0.38}Si_{0.2}O_{0.4}S_{0.82}I_{0.37}$ and a cathode comprising a composite prepared by mixing the solid electrolyte $Li_{0.85}B_{0.38}Si_{0.2}O_{0.4}S_{0.82}I_{0.37}$ and $TiS_2$ (Sigma Aldrich, 99.9%, particle size 75 µm) in a 1:1 weight ratio. The cathode composite (8 mg; $TiS_2$ content corresponding to 5.13 $mg/cm^2$), and the solid electrolyte (60 mg) were pressed in a 10 mm diameter PEEK cylinder to form a bilayer pellet. The Li—In alloy of the anode has a target composition $Li_{0.5}In$ and was formed by pressing a lithium foil and an indium foil in a 0.5 molar ratio, and placed in contact with the solid electrolyte. The cell was then sandwiched between two stainless steel rods and held under pressure using a custom-made device. The cell was allowed to rest for 8 hours before cycling in order to allow for pressure relaxation of the cell. The areal capacity of the cell was 1.2 $mAh/cm^2$. Galvanostatic cycling (charging/discharging) of the cell was performed at room temperature using a Bio-Logic VMP-3. The cell was charged and discharged at C/10 in the voltage range 0.9 to 2.4 V vs. Li—In (1.5 to 3 V vs. Li) at room temperature (~25° C.).

Figure 5:
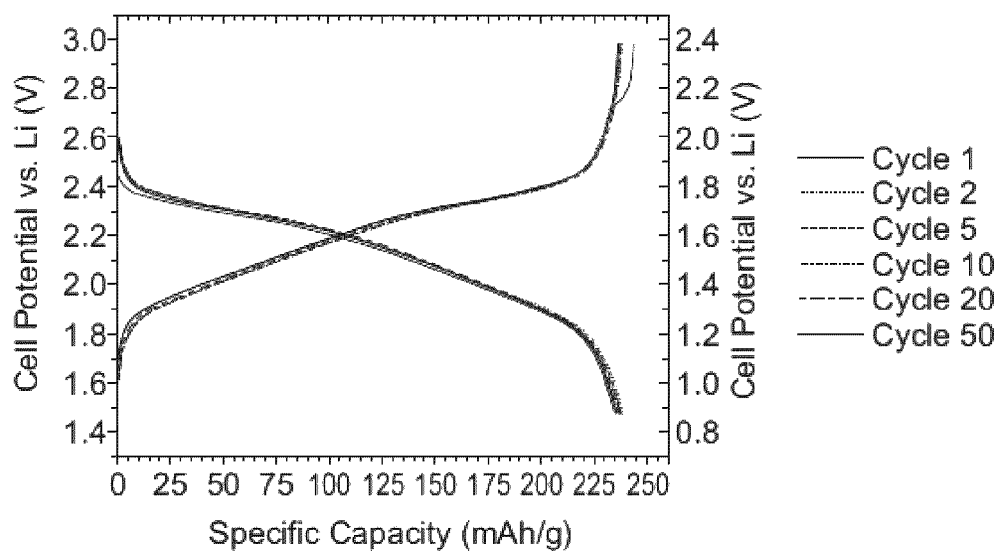
Figure 6:
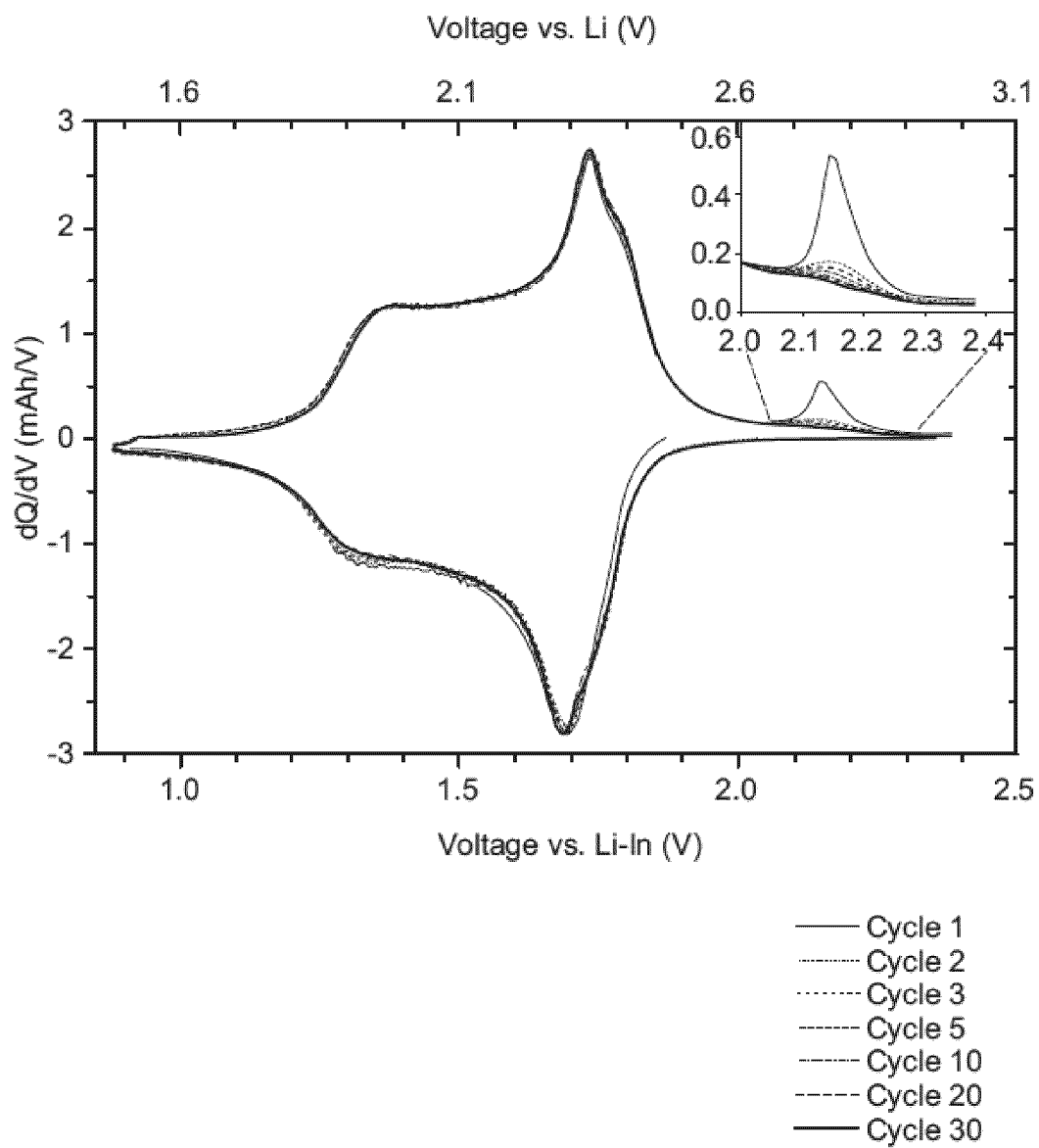

The charge-discharge curves of cycles 1, 2, 5, 10, 20 and 50 are shown in FIG. 5. Upon the first charging cycle at 2.7 V vs. Li, a tiny irreversible capacity (6 mAh/g) is evident that is attributed to initial electrolyte oxidation at the cathode interface. The potential at which this irreversible capacity is observed is similar to what has been observed in thiophosphate-based electrolytes, where $S^{2-}$ undergoes oxidation, see e.g. W. D. Richards, L. J. Miara, Y. Wang, J. C. Kim, G. Ceder, Chem. Mater. 2015, 28, 266; and R. Koerver, F. Walther, I. Aygün, J. Sann, C. Dietrich, W. G. Zeier, J. Janek, J. Mater. Chem. A 2017, 5, 22750. This irreversible process occurring in the first charging cycle is more clearly seen in the corresponding dQ/dV plots shown in FIG. 6. The peak at 2.15 V vs. Li—In exhibits a rapid drop in intensity after the first cycle and completely disappears by the tenth cycle, suggesting the formation of a stable cathode-electrolyte interface.

Figure 7:
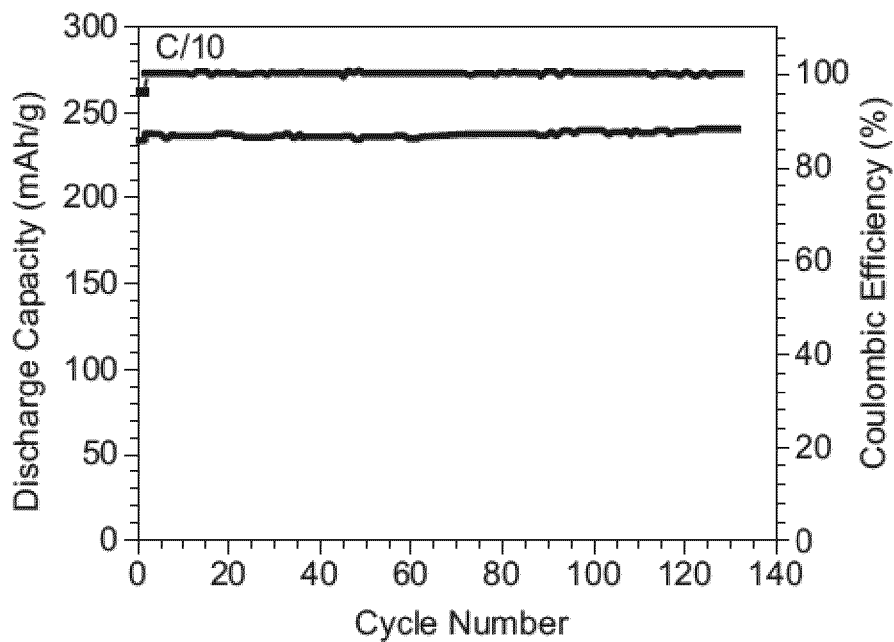

After the first cycle, the cell shows excellent cycling performance at C/10 (upper graph in FIG. 7), with virtually no capacity fade over three months of cycling. The cell maintains a capacity of ~239 mAh/g (theoretical capacity of TiS$_2$: 240 mAh/g) for more than 130 cycles with high coulombic efficiency of 99.9% on average (lower graph in FIG. 7).

Figure 8:
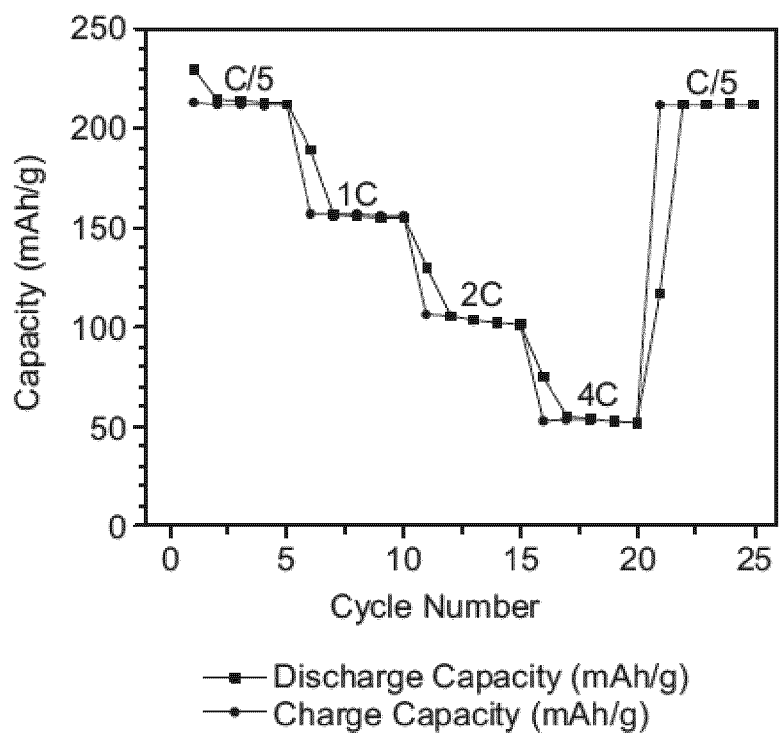

Rate capabilities of an identical all-solid-state cell cycled within the same voltage range and at 25° C. are shown in FIG. 8. Initially, the cell cycled at C/5 achieves a capacity of 213 mAh/g, which represents 90% capacity retention on doubling the current density. On subsequent increase of the current density to a 1 C rate, 75% of the capacity is retained and the capacity is fully recovered upon returning to the initial C/5 rate.

The invention claimed is:

1. A solid material having a composition according to general formula (I)

$$Li_{2x+z}B_{2y}M_aO_{b*a}S_{x+3y}X_z \qquad (I)$$

wherein
M is one or more selected from the group consisting of P, Si, and Sb
X is one or more selected from the group consisting of Cl, Br, and I
x is in the range of from 0.1 to 0.7
y is in the range of from 0.05 to 0.5
z is in the range of from 0.01 to 0.5
a is in the range of from 0.2 to 0.3
b is in the range of from 1.9 to 2.6
0.995≤x+y+z+a≤1.005.

2. The solid material according to claim 1, wherein said solid material having a composition according to general formula (I) is glassy.

3. The solid material according to claim 1, wherein M is Si and X is selected from the group consisting of Cl, Br and I.

4. The solid material according to claim 1, having a composition according to general formula (Ia)

$$Li_{2x+z}B_{2y}Si_aO_{b*a}S_{x+3y}I_z \qquad (Ia)$$

wherein
x is in the range of from 0.1 to 0.3
y is in the range of from 0.1 to 0.25
z is in the range of from 0.2 to 0.48
a is in the range of from 0.2 to 0.3
b is in the range of from 1.95 to 2.05
0.995≤x+y+z+a≤1.005.

5. The solid material according to claim 1, wherein the solid material has an ionic conductivity of 0.1 mS/cm or more.

6. The solid material according to claim 1, wherein the solid material is in the form of a sheet.

7. A process for preparing a solid material as defined in claim 1, said process comprising
a) providing the precursors
Li$_2$S
B$_2$S$_3$ or both of boron and sulfur
one or more oxides of elements M selected from the group consisting of P, Si, Ge, As and Sb
one or more compounds LiX wherein X is selected from the group consisting of halides and pseudohalides
b) preparing a mixture comprising the precursors provided in a), wherein in said mixture the molar ratio of the elements Li, S, B, M, O and X matches general formula (I)
c) heat-treating the mixture to obtain a melt
d) quenching the melt so that a solid material having a composition according to general formula (I) is obtained.

8. The process according to claim 7, wherein
the precursors provided in a) are Li$_2$S, S, B, SiO$_2$ and one or more of LiCl, LiBr and LiI and/or
in b) mixing is performed by means of mechanical milling and/or
in c) heat-treating is performed in a closed vessel and/or
in d) quenching is performed by contacting the melt with water, ice, a sub-cooled gas, a metal plate or a chemically inert mold.

9. The process according to claim 7, wherein c) comprises
a first stage of heat-treating at a temperature in the range of from 400° C. to 650° C. for a duration of 1 to 13 hours, and
a second stage of heat treating at a temperature in the range of from 700° C. to 1000° C. for a duration of from 1 to 40 hours.

10. The process according to claim 8, wherein in b) the mixture comprising the precursors is formed into pellets, which are heat-treated in c).

11. The process according to claim 8, wherein in b) any handling is performed under a protective gas atmosphere.

12. The solid material according to claim 1 for use as a solid electrolyte for an electrochemical cell, wherein preferably the solid electrolyte is a component of a solid structure for an electrochemical cell selected from the group consisting of cathode, anode and separator.

13. A solid structure for an electrochemical cell, wherein said solid structure is selected from the group consisting of cathode, anode and separator, wherein the solid structure comprises a solid material according to claim 1.

14. An electrochemical cell comprising a solid material wherein preferably the solid material is a component of a solid structure as defined in claim 13.

15. The solid material according to claim 1, wherein z is in the range of from 0.33 to 0.41.

* * * * *